INVENTORS.
ROBERT M. TILLMAN
JAMES D. HENRY
BY Edward W. Hughes
ATTORNEY

INVENTORS.
ROBERT M. TILLMAN
JAMES D. HENRY

BY *Edward W. Hughes*

ATTORNEY

United States Patent Office 3,221,270
Patented Nov. 30, 1965

3,221,270

SATURABLE CORE MULTIVIBRATOR WITH AUXILIARY FLUX GENERATING FREQUENCY CONTROLS

Robert M. Tillman, Willow Grove, and James D. Henry, Paoli, Pa., assignors to Burroughs Corporation, Detroit, Mich., a corporation of Michigan
Filed Sept. 26, 1957, Ser. No. 686,309
3 Claims. (Cl. 331—113)

This invention relates to methods and apparatus for controlling the magnitude of the switched flux of a device, or core, made from a magnetic material which has a substantially rectangular hysteresis loop; and more particularly, to methods and apparatus for controlling the magnitude of the switched flux $\Phi_S$ of magnetic multivibrators, where $\Phi_S$ may be defined as being the total change of magnetic flux within a magnetic device.

There have been developed oscillators in which their frequency of operation is a function of the magnitude of the switched flux $\Phi_S$ of the core with which each of such oscillator is provided. There have also been developed pulse generators in which the voltage time product of each output pulse produced by each such generator is determined by the magnitude of the $\Phi_S$ of the core with which each of such pulse generators is provided. Such oscillators and pulse generators will hereinafter be referred to as being magnetic multivibrators, either free-running or monostable. The four-winding oscillator disclosed in Patent No. 2,783,384, dated February 26, 1957, by R. L. Bright et al. and the two-winding oscillator disclosed in U.S. Patent application Serial No. 636,740, filed January 28, 1957, entitled Square Wave Oscillator, by R. M. Tillman, assigned to the same assignee as this application, now Patent No. 2,912,653 issued Nov. 10, 1959 are examples of free-running magnetic multivibrators. The pulse generator illustrated in FIG. 5 of Patent No. 2,591,-406, dated April 1, 1952, by E. P. Carter et al. is an example of a monostable magnetic multivibrator.

It is a characteristic of devices and cores made from magnetic materials having substantially rectangular hysteresis loops, that the magnitude of the $\Phi_S$ for each such core or device in a given circuit configuration is substantially constant provided the temperature of each core is maintained constant. It is also apparently an inherent characteristic of such devices, or cores, that as their temperatures increase, the magnitude of their switched flux $\Phi_S$ decreases.

In free-running magnetic multivibrators, the frequency of oscillation is inversely proportional to the $\Phi_S$ of its associated core and directly proportional to the magnitude of the supply voltage. In monostable magnetic multivibrators the pulse width of each pulse is directly proportional to the $\Phi_S$ of its associated core and inversely proportional to the magnitude of the supply voltage. If, in both cases, $\Phi_S$ and the turns ratio remain constant, then the frequency, or the pulse width, depending on the type of magnetic multivibrator, is a function of the applied voltage over a reasonably wide range of voltages. In order to accurately maintain the relationship between applied voltage and frequency, or pulse width, it is necessary to maintain $\Phi_S$ constant. To maintain $\Phi_S$ constant, it has heretofore been necessary to keep the temperature of the magnetic cores of such magnetic multivibrator constant. The only way to prevent changes of $\Phi_S$ due to temperature heretofore has been to locate such magnetic multivibrators in constant temperature devices, such as ovens, and the only way to compensate for changes of $\Phi_S$ due to temperature, has been to vary the magnitude of the supply voltage with temperature.

Magnetic multivibrators present a relatively low impedance to the source of the supply voltage. In many applications, the source of the variable voltage with which it is desired to control a magnetic multivibrator has a high impedance. When a high impedance source is used, it is necessary to provide an impedance matching circuit to prevent overloading the source. In order to eliminate the need for impedance matching circuit, it is thus desirable to provide high impedance means for controlling frequency or pulse width of magnetic multivibrators.

In accordance with the practice of the invention there is provided a magnetic multivibrator which includes a magnetic core having at least one auxiliary opening therethrough and arranged so as to provide symmetrical magnetic paths. The magnetic core is of substantially rectangular hysteresis loop material. A plurality of windings are arranged on the core and at least one electrical signal amplifying means is arranged so that the conduction path therethrough includes first and second windings of said plurality of windings. Control means are coupled to the core for establishing a controlled magnetic field in the core and additionally, means are provided for varying the magnitude of the controlled magnetic field so that the magnitude of the switch flux of the core can be varied, thereby to control the frequency or pulse width of the output signal from the multivibrator.

It is an object of this invention to provide methods and apparatus for controlling the magnitude of the switched flux of the magnetic device of a magnetic multivibrator.

It is a further object of this invention to provide methods and apparatus for continuously and reversibly controlling the magnitude of the switched flux of the magnetic core of a magnetic multivibrator.

It is a still further object of this invention to provide methods and apparatus for controlling the magnitude of the switched flux of a magnetic core of a magnetic multivibrator as a function of one or more independent variables.

It is another object of this invention to provide high impedance means for varying the frequency or pulse width of magnetic multivibrators.

It is still another object of this invention to provide electromagnetic means for compensating for the change in magnitude of the switched flux of the magnetic core of a magnetic multivibrator with temperature.

Other objects and many of the attendant advantages of this invention will be readily appreciated as the same become better understood by reference to the following detailed description when considered in connection with the accompanying drawings wherein.

Figures 1, 2, 3, 4:
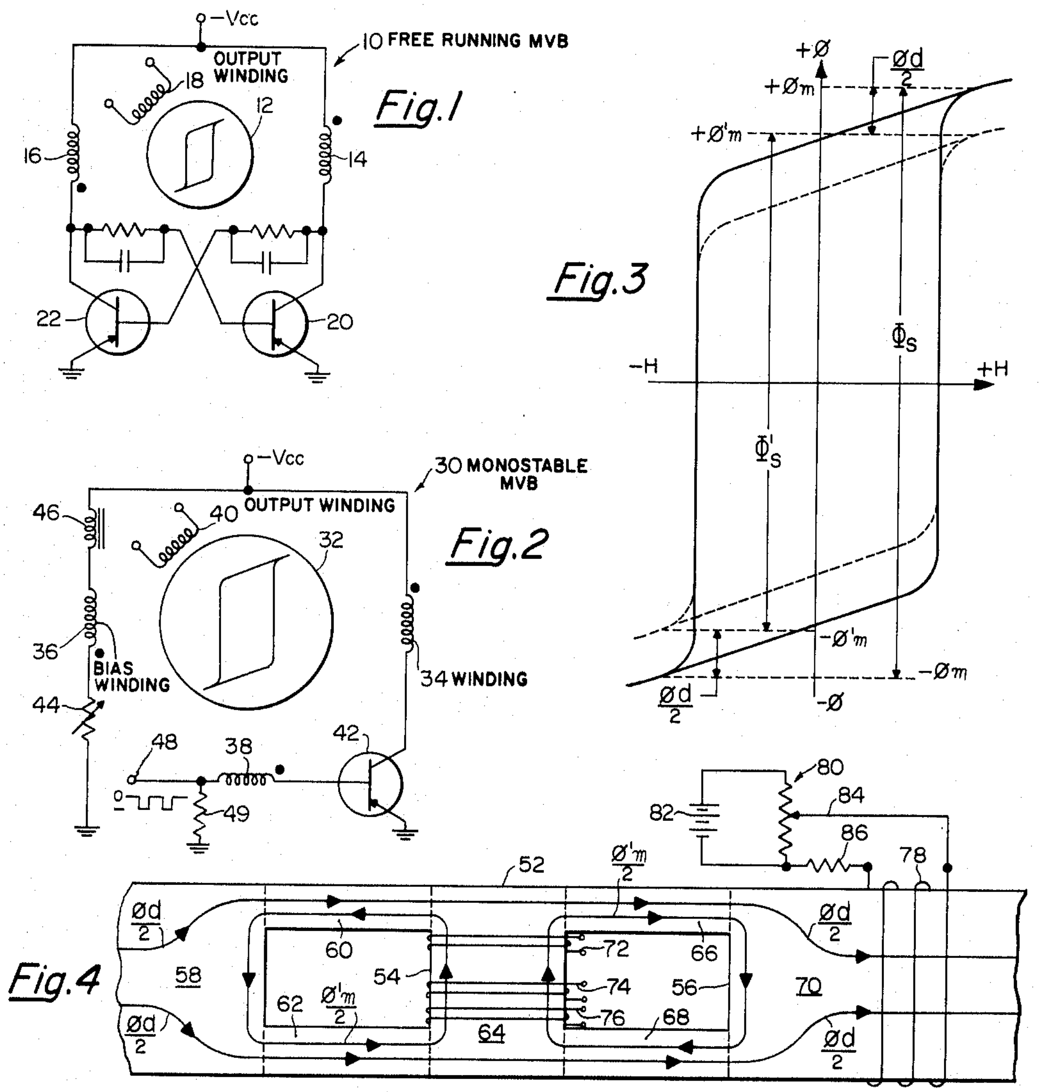
FIG. 1 is a schematic diagram of a free-running magnetic multivibrator.
FIG. 2 is a schematic diagram of a monostable magnetic multivibrator.
FIG. 3 is an idealized hysteresis loop of a magnetic material.
FIGS. 4 and 5 are plan views of a bar of magnetic material, with the end portions broken away.

FIGS. 1 and 2 are schematic diagrams of a free-running magnetic multivibrator and a monostable magnetic multivibrator respectively. In FIG. 1 the free-running magnetic multivibrator, or oscillator, 10 is of the type disclosed in U.S. Patent No. 2,912,653, referred to above, and is comprised of a core 12 made from a magnetic material which has substantially rectangular hysteresis loops such as "4–79 molybdenum permalloy." On core 12 there are wound windings 14 and 16 which have the same number of turns, and an output winding 18. One terminal of each of the windings 14, 16, is dotted. This symbolization is used to indicate the direction in which windings 14, 16, are wound on core 12, and by definition, conventional current flowing into a dotted terminal will cause the resultant magnetic field H to be negative, and current flowing out of a dotted terminal will cause the magnetic field H to be positive. The undotted terminal of winding 14 is connected to the collector of junction transistor 20 which is illustrated as being a pnp transistor. The collector of junction transistor 22 is connected to the dotted terminal of winding 16. The dotted terminal of winding 14 and the undotted terminal of winding 16 are connected to a D.C. source of collector supply potential, $-Vcc$ which is not illustrated. The collector of transistor 22 is connected by a parallel resistor-capacitor network to the base of transistor 20, and the collector of transistor 20 is similary connected by a similar resistor-capacitor network to the base of transistor 22.

When a suitable source of unidirectional potential $-Vcc$ is connected through windows 14, 16, to the collectors of transistors 20, 22, one of these transistors will begin to conduct more heavily than the other. If, for example, it is transistor 20, then current will begin to flow through winding 14 to establish a +H field. If H is sufficiently large, the flux $\phi$ in the core will increase in the positive direction until it reaches a maximum positive value $+\phi_m$ as illustrated in FIG. 3. Changes in $\phi$ induce voltages in winding 16 which will tend to keep transistor 20 conducting heavily. When the flux in core 12 reaches a flux value of $+\phi_m$, the coupling between windings 14, 16, becomes insufficient to the bias transilstor 20 to cause any further positive increase in H. Transistor 20 begins to cut off which decreases H, with a subsequent decrease in the flux $\phi$ in the circuit which, in turn, induces voltages in windings 14, 16, which quickly shut off transistor 20 and turn on resistor 22. After a few cycles, the charges built up across the capacitors of the coupling circuits act to more quickly cut off the "on" transistor and to hold the "off" transistor off during switchover transients each time the core reaches $+\phi_m$ or $-\phi_m$, to decrease the transistor switching time.

Transistors 20, 22, operate substantially as switches, so that the voltage across the winding in the collector circuit of the conducting transistor substantially equals the collector supply voltage.

The relationship between the potential $v$ in volts across a winding on a core and the rate of change of $\phi$ in maxwells in the core is given by the following:

$$v=10^{-8}N\frac{d\phi}{dt} \qquad \text{Equation 1}$$

Substituting $Vcc$ for $v$ in Equation 1, and integrating Equation 1 provides:

$$Vcc\int_0^{T/2}dt=10^{-8}N\int_{-\phi_m}^{+\phi_m}d\phi \qquad \text{Equation 2}$$

$$VccT=2\times10^{-8}N\phi_s \qquad \text{Equation 3}$$

$$T=\frac{2\times10^{-8}N\phi_s}{Vcc} \qquad \text{Equation 4}$$

where:

$\Phi_S=2\phi_m$
$t$=time in seconds
$N$=number of turns
$T$=period for the core to complete one cycle Assuming that the switching times of the transistors of magnetic multivibrators are negligible, it is obvious from Equation 4 that if $\Phi_S$ is constant then the time T it takes a core to switch through one complete cycle is an inverse function of the applied voltage, $Vcc$. However, if $Vcc$ is kept constant, then the magnitude of T varies directly as $\Phi_S$. For a more detailed explanation of the operation of the free-running multivibrator, see Patent No. 2,912,653, supra.

FIG. 2 is a schematic diagram of a monostable magnetic multivibrator. It differs from the magnetic multivibrator illustrated in the patent to Carter et al. referred to above, in that a transistor is used as the amplifying device, or switch, instead of an electron tube. Monostable magnetic multivibrator, or pulse generator, 30 is comprised of a core 32, which is preferably toroidal and formed of a magnetic material having substantially rectangular hysteresis characteristics, similar to core 12 of oscillator 10. Wound on core 32 is a collector winding 34, a D.-C. bias winding 36, a base winding 38 and an output winding 40. The significance of the dotted terminals of windings 34, 36, 38, is the same as for the device illustrated in FIG. 1. The collector of junction transistor 42 which is illustrated as being a pnp transistor is connected to the undotted terminal of winding 34. The undotted terminal of winding 36 and the dotted terminal of winding 34 are connected to a suitable source of direct current potential, $-Vcc$, which is not illustrated. The dotted terminal of winding 36 is illustrated as being connected through variable resistor 44 to ground. Inductor 46 is connected in series with bias winding 36 and variable resistor 44 to reduce variations in the magnitude of the current flowing through bias winding 36. As long as no trigger pulse is applied to input terminal 48, the base of transistor 42 will be substantially at ground potential because of resistor 49. Transistor 42 will be cut off and substantially no current will be flowing through winding 34. The value of resistor 44 is chosen so that the magnitude of current flowing through bias winding 36 will maintain the flux in core 32 at its maximum negative value $-\phi_m$.

The application of a negative pulse of sufficient amplitude and duration to input terminal 48 and to the base of transistor 42 through base winding 38 causes transistor 42 to begin to conduct. Collector current of transistor 42 flowing through winding 34 creates a positive magnetic field of sufficient strength to cause core 32 to change its magnetic state from $-\phi_m$ to $+\phi_m$. Windings 34 and 38 are regeneratively coupled so that as core 32 is switched from flux value of $-\phi_m$ to $+\phi_m$, the potential of the dotted terminal of winding 38 is sufficiently negative to maintain transistor 42 conducting heavily until the flux in core 32 reaches the value of $+\phi_m$. When this point is reached, the coupling between windings 34, 38, is insufficient to bias transistor 42 sufficiently to produce a further increase in H or $\phi$. The voltage induced in winding 38 decreases, and transistor 42 quickly cuts off. The current flowing through winding 36 then returns the magnetic flux in core 32 to $-\phi_m$ where it remains until a subsequent trigger is applied to the base of transistor 42.

When transistor 42 is conducting heavily, the voltage drop across collector winding 34 is substantially equal to $Vcc$. Even when $Vcc$ is slowly varying in magnitude, the period of the changes in $Vcc$ is so much greater than the period of the pulses produced by generator 30 that $Vcc$ can be considered to be constant. Thus, since $Vcc$ is constant, or can be assumed to be constant, it follows from Equation 1 that $d\phi/dt$, the rate of change of $\phi$ with time in core 32 will be substantially constant. Therefore, the amplitude of the voltage pulse induced in output winding 40 will be substantially constant, and will be determined by the magnitude of $Vcc$. Equation 3 shows that the voltage time product of each output pulse will be determined by the magnitude of the $\Phi_S$ of core 32 and the number of turns of winding 40. The width of each output pulse will vary directly with $\Phi_S$ since the number of turns is fixed, or a constant.

According to the most widely accepted theory of magnetization, any magnetic material consists of a large number of very small donations, each domain, though small, is comprised of a large number of atoms. The absolute value of the magnetization of each domain is constant due to the interaction forces within each domain. A magnetic device is saturated when all its magnetic domains are aligned. However, it takes a magnetic field of very great strength to saturate as defined above, a magnetic device.

A core such as core 12 of free-running magnetic multivibrator 10, has maximum and minimum values of magnetic flux corresponding to $+\phi_m$ and $-\phi_m$ as seen in FIG. 3. The value of the switched flux $\Phi_S$ is:

$$\Phi_S=\phi_m-(-\phi_m)=2\phi_m \qquad \text{Equation 5}$$

If a control magnetic field $H_d$ is established in magnetic device such as core 32, a certain number of a magnetic domains of core 32 corresponding to a magnetic flux $\phi_d$ will substantially align themselves with $H_d$. The number of such domains, or the magnitude of $\phi_d$ controlled by, or held captive, is determined by the magnitude of the control field $H_d$. When no control field $H_d$ exists, the maximum values of the switched flux correspond to $\Phi_S$. When a control field $H_d$ exists, the maximum value of the switched flux of a free-running multivibrator for example, corresponds to $+\phi'_m$ and $-\phi'_m$ as illustrated in FIG. 3. The magnitude of the switched flux $\Phi'_S$ when a control $H_d$ exists, is:

$$\Phi'_S=\phi'_m-(-\phi'_m)=2\phi'_m \qquad \text{Equation 6}$$

The relationship between $\Phi'_S$, and $\Phi_S$ is:

$$\Phi'_S=\Phi_S-\phi_d \qquad \text{Equation 7}$$

Figure 5:
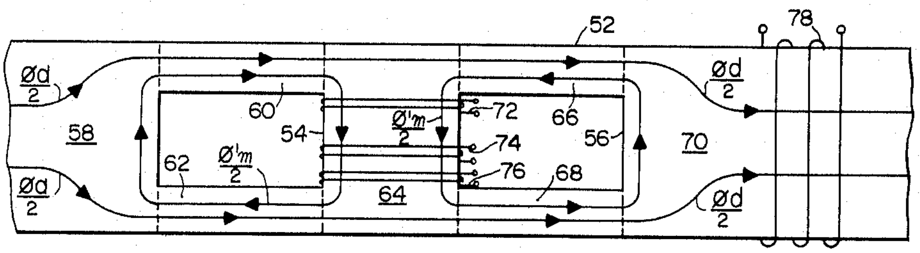

FIGS. 4 and 5 are plan views of a bar of magnetic material, with lines of magnetic flux drawn thereon to illustrate a proposed theory of how the control magnetic field regulates the magnitude of the switched flux of a magnetic device or core. Bar 52, whose length is considerably greater than its width, is made up of magnetic material having substantially rectangular hysteresis loop similar to that illustrated in FIG. 3. In Bar 52, two rectangular auxiliary openings 54, 56, are formed. Around the openings 54, 56, the material of bar 52 may be arbitrarily divided as indicated by dash lines into portions, or legs, 58, 60, 62, 64, 66 68 and 70. Leg 64, between openings 54, 56, is common to the magnetic circuits around both openings 54, 56. Windings 72, 74, 76, illustrated schematically in FIGS. 4 and 5, are wound through openings 54, 56, or around leg 64. Windings 72, 74, may correspond to windings 14 and 16 of free-running magnetic multivibrator 10, and winding 76 may correspond to the output winding 18 of oscillator 10.

The magnetic material of bar 52 around the openings 54, 56, is the equivalent of core 12 illustrated schematically in FIG. 1. In the absence of any control field, the magnitude of the switched flux of the magnetic material around openings 54, 56, will be $\Phi_S$, which is determined by the characteristics of bar 52 including its temperature, and of the magnetic multivibrator associated with the windings around leg 64. In bar 52, it should be noted that the length and the width of the legs 60, 62, 66 and 68 are substantially equal, and that the width of the common leg 64 is greater than twice that of leg 60, for example.

Wound around the bar 52 is a control winding 78 which may be energized from potentiometer 80 and a source of D.-C. potential 82, for example. The current flowing through control winding 78 will cause control magnetic flux $\phi_d$ to exist in bar 52. Since the widths and lengths of legs 60, 62, 66 and 68 are substantially equal, it can be assumed that the reluctance of the magnetic paths on either side of auxiliary openings 54, 56, are substantially equal. Therefore, the control flux will divide into two equal portions equal to $\phi_d/2$ with one-half flowing through legs 60, 66 and the other half flowing through legs 62, 68. The direction, or polarity, of control flux $\phi_d$ in bar 52 may be assumed to be as indicated by the arrowheads in FIGS. 4 and 5; and the magnetic flux due to the current flowing through one of the windings on leg 64, such as winding 72, of a free-running magnetic multivibrator may be assumed to establish closed loops of magnetic flux around opening 54, 56, of the direction or polarity as illustrated in FIG. 4.

When the magnitude of the magnetic flux in legs 62, 66, due to current flowing through winding 72 has a value equal to $\phi'_m/2$, the total magnetic flux in legs 62 and 66 will be equal to $$\frac{\phi'_m}{2}+\frac{\phi_d}{2}=\frac{\phi_m}{2}$$

The value of the flux around openings 54, 56, will have the value $\phi'_m$ at which regeneration can no longer be sustained. Current will then begin to flow through winding 74 as described supra and establish around openings 54, 56, a magnetic field of opposite direction or polarity from that established by current flowing through winding 72. This is illustrated in FIG. 5. When the flux due to current in winding 74 reaches a value of $\phi'_m/2$, in legs 60, 68, the magnetic flux in these legs reaches the value $\phi_m/2$ and regeneration can no longer be sustained. Current will then begin to flow through winding 72 to drive the magnetic material around openings 54, 56, back to the initial magnetic state or condition.

Any increase in the magnitude of the control field will increase the magnitude of the flux $\phi_d$ which will reduce the magnitude of the switched flux $\Phi'_s$ of the magnetic material around openings 54, 56. Thus, by increasing or decreasing the magnitude of the control flux $\phi_d$, the magnitude of switched flux $\Phi'_s$ of the magnetic core or device formed by the material around auxiliary openings 54, 56, may be varied. Since the magnitude of the switched flux determines the frequency of a free-running oscillator, or the pulse width of a pulse generator such as is illustrated in FIG. 3, assuming the supply voltage *Vcc* is constant, one is able to vary the frequency, or pulse width, of magnetic multivibrators by controlling the magnitude of the switched flux $\Phi'_s$ of the cores of such devices.

As pointed out above, the width of leg 64, the minimum distance between adjacent edges of openings 54, 56, should at least equal twice the width of leg 60, for example. This prevents the flux density of leg 64 from exceeding that in legs 60, 62, 66, 68. As a result, the amount of flux in leg 64 will not be a factor in determining the magnitude of the switched flux of the material around openings 54, 56. By increasing the length of legs 60, 62, 66, 68, it is believed that the effectiveness of the control means may be enhanced.

The manner in which a control field regulates the magnitude of the switched flux of a core having a single auxiliary opening is believed to be readily understandable from the preceding explanation with respect to a core having two auxiliary openings. However, an explanation with respect to a core having a single opening is found in U.S. Patent application Serial No. 686,308, filed September 26, 1957, by R. M. Tillman, entitled Electrical Apparatus, assigned to the assignee of this application.

The position of the movable arm 84 of potentiometer 80 illustrated in FIG. 4 can be varied as a function of any number of independent variables, such as velocity, weight, acceleration, temperature; or variations in the current flow through control winding 78 may be achieved by any means by which physical measurements may be converted into unidirectional voltages or currents. Thus, it is possible to vary the magnitude of the control magnetic field by electrical means so as to make it a function of any independent variable, either directly or indirectly. It is also possible to vary the current flowing through control winding 78, for example, by means of a temperature sensitive resistance such as "thermistor" or by a thermocouple so that the magnitude of the control flux is a function of temperature. By these means, changes in the value of the switched flux of a core with temperature may be compensated.

The sensitivity of a free-running magnetic multivibrator; i.e., the rate of change of frequency with respect to change in the magnetomotive force of the control winding can be varied by varying the geometry of the cores. By increasing the number of turns of the control winding, the impedance of the control circuit can be increased while still maintaining adequate sensitivity. The impedance of the control circuit can be further increased by placing a fixed resistor such as resistor 86 in series with control winding 78. By these means input impedances of the order of 500,000 ohms have been achieved.

Figures 6, 7, 8, 9, 10:
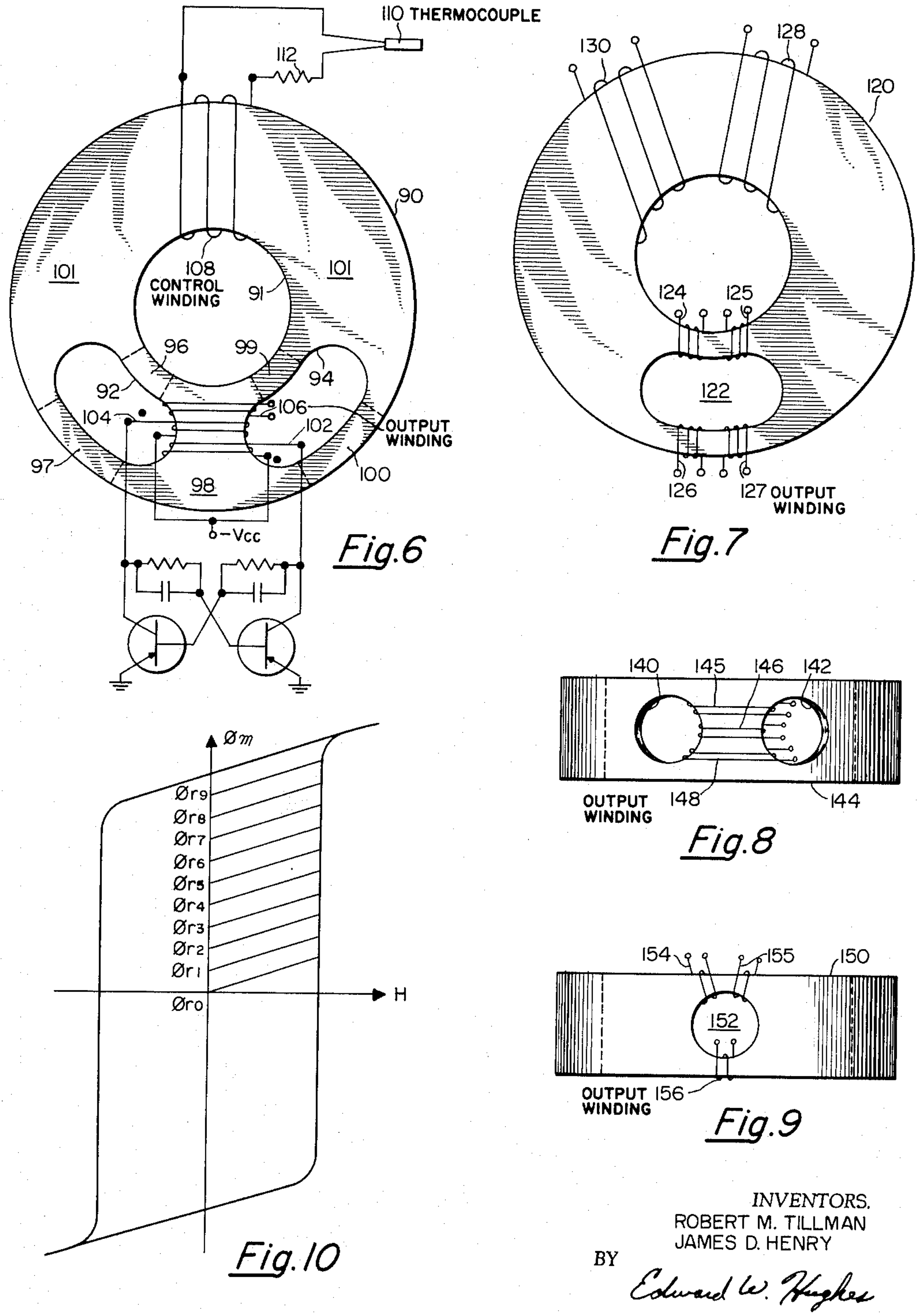
FIGS. 6 and 7 are plan views of two forms the magnetic cores of magnetic multivibrators may assume.
FIGS. 8 and 9 are side elevations of two additional forms the magnetic cores of magnetic multivibrators may assume.
FIG. 10 is an idealized hysteresis loop of a magnetic material illustrating the remanent states of a counting core.

In FIGS. 6, 7, 8 and 9, there are illustrated various configurations of magnetic devices, or cores, suitable for practicing this invention. There is an air gap in the control magnetic circuit of bar magnet 52 illustrated in FIGS. 4 and 5. The air gap can be eliminated by connecting the ends of the bar together. Eliminating the air gap reduces the reluctance of the control magnetic circuit. As a result, the value of the control flux $\phi_d$ for a given magnetomotive force is increased. In FIG. 6, toroidal core 90 is provided with a central circular opening 91 and a pair of auxiliary axial openings 92, 94. The magnetic material around auxiliary openings 92, 94, may be arbitrarily divided into legs 96, 97, 98, 99, 100, 101. Windings 102, 104, 106, which may correspond to windings 14, 16 and 18 of oscillator 10, are wound through openings 92, 94, or around common leg 98. Windings 102, 104 are illustrated as being connected in a circuit to form a free-running magnetic multivibrator. The number of turns of windings 102, 104, 106 are a matter of design. The number illustrated is purely symbolic. If it is desired to use core 90 in a monostable magnetic multivibrator, it would be necessary to add a fourth winding around leg 98. Control winding 108 is placed around core 90 or around leg 101.

The source of the electromotive force or electrical energy needed to energize control winding 108 is illustrated in FIG. 6 as being a thermocouple 110. Connected in series with thermocouple 110 and winding 108 is a resistor 112. With the core of this particular configuration, it is possible to vary the frequency of the free-running magnetic multivibrator such as is illustrated in FIG. 6, so that the frequency of the oscillator will be a function of the temperature measured by thermocouple 110. The sensitivity is such as there is no need for an amplifying device to increase the power produced by thermocouple 110.

When a pair of auxiliary openings such as openings 92, 94, illustrated in FIG. 6 are used, the coupling between the windings 102, 104, 106, around leg 98 and control winding 108 is minimized. The minimum width of common leg 98 is made equal to or greater than twice the width of the leg portions 96, 97, 99, 100. As a result, the flux density in leg 98 will not exceed that in any of legs 96, 97, 99, 100. Thus, the magnitude of the magnetic flux in leg 98 will not be a factor in determining the magnitude of $\Phi'_s$ of the magnetic material around openings 92, 94. The length of openings 92, 94, are made greater than their width to increase the length of the material in which the magnetic flux reaches the critical value $\phi_m/2$ each time the core switches. When axial openings such as 92, 94, are formed in core 90, then core 90 may be assembled by stacking a plurality of laminations, with each lamination having a pair of openings formed therein shaped and spaced as are openings 92, 94, in FIG. 6.

In FIG. 7 a substantially toroidal core 120 is illustrated with a single elongated axial auxiliary opening 122 formed therein. The particular size and shape of auxiliary openings 92, 94, 122 are not critical to the operation of a magnetic multivibrator, however, the geometry of the cores does affect the overall efficiency and sensitivity of magnetic multivibrators. Windings 124, 125, 126, 127 are wound through opening 122, or around the magnetic material surrounding core 122 and they may correspond to the collector winding, bias winding, base winding and output winding of a monostable magnetic multivibrator. Control winding 128 is wound around core 120. Winding 128 is adapted to have electrical current from a suitable source (which is not illustrated) flow through it to vary the switched flux of the magnetic material around opening 122. The magnitude of the current can be varied as a function of any independent variable which can be converted to analog voltage or current by means well known in the art.

A second control winding 130 may be wound on core 120. The magnitude of the switched flux $\Phi'_s$ of the magnetic material around opening 122 may then be a function of more than one independent variable. For example, control winding 130 could be used to compensate for temperature changes of core 120 and control winding 128 may be used to vary the magnitude of the switched flux $\Phi'_s$ as a function of second independent variable such as acceleration.

In FIG. 8, circular radial auxiliary openings 140, 142 are formed in a toroidal core 144, for example. The windings 145, 146, 148 are wound between openings 140, 142. Control windings may be wound around core 144 in a manner similar to that of winding 108 on core 90 of FIG. 6. When radial openings such as illustrated in FIG. 8 are used, then the core 144 may be built from a thin strip of magnetic material wound on a bobbin, for example. Openings 140, 142 are then formed in the core by drilling, or electroyltic etching, or other other suitable means. The windings 145, 146, 148 may be those of a free-running magnetic multivibrator.

In FIG. 9 core 150, similar to core 144, is illustrated. Core 150 has a single radial auxiliary opening 152 formed in it. Windings 154, 155, 156 of a free-running magnetic multivibrator such as illustrated in FIG. 1 may be wound through opening 152, or around the magnetic material defining opening 152. One or more control windings may be wound around core 150.

As long as the magnitude of the control field $H_d$ is small compared with the coercive force of the magnetic material from which the core is made, changes in the switched flux $\Phi'_s$ are substantially reversible. By this it is meant when the control field $H_d$ is cyclically varied substantially no hysteresis will occur. If $H_d$ exceeds the maximum reversible value, control flux $\phi_d$ will not be reversible, but will have a remanent value.

In FIG. 10 there is illustrated the idealized hysteresis loop of a core such as core 90 illustrated in FIG. 6. Core 90 can be used as the counting core of a magnetic device such as illustrated in patent application Serial No. 498,257, filed March 31, 1955 by T. C. Chen and R. A. Tracy, assigned to the same assignee. Core 90 may be switched from its unmagnetized state where its flux value is substantially "0" to its maximum value of $\phi_m$ in ten steps, for example. For each of these ten steps there will be a residual magnetic control flux of values $\phi_{r0}$ to $\phi_{r9}$. For each of the 10 values of the remanent flux in core 90, $\Phi'_s$ of the magnetic material around auxiliary openings 92, 94 will have a corresponding value, and the free-running magnetic multivibrator whose windings are wound through openings 92, 94, will have a corresponding frequency. With such an arrangement it will then be possible to indicate the remanent state, or the number of input pulses that have been applied, to a counting core without changing the remanent state of the core. Thus a nondestructive method for learning the number of pulses applied to a counting core is provided.

The explanation of the manner in which the control flux in the core of magnetic multivibrators regulates the effective switching flux of the core, is the best explanation that has been developed to date. It is believed to be accurate and is supported by tests. It is, however, only the best theory for explaining the results observed known to the inventors at this time.

Obviously many modifications and variaitions of the present invention are possible in the light of the above teachings. It is, therefore, to be understood that within the scope of the appended claims the invention may be practiced other than as specifically described and illustrated.

What is claimed is:

1. A free running magnetic multivibrator comprising a substantially toroidal core of magnetic material having a central opening and a pair of substantially equally sized auxiliary openings formed therethrough, the magnetic material of said core surrounding said auxiliary openings forming a plurality of legs, with side legs determined by inner and outer periphery of said core and said auxiliary openings, said side legs being substantially equal in width, and a common leg determined by the most closely spaced edges of said auxiliary openings, the width of common leg being at least twice the width of one of said legs, a first winding, a second winding, and an output winding, said windings being wound around said common leg, a pair of junction type transistors, each transistor having three electrodes, one electrode of each transistor being connected in common, a second electrode of each transistor being connected in series with said first and second windings respectively, the remaining electrode of each transistor being cross connected to said first and second windings respectively, a control winding wound on said toroidal core, and means for variably energizing said control winding.

2. A free running magnetic multivibrator according to claim 1 in which the said auxiliary openings extend axially through said core.

3. A free running magnetic multivibrator comprising a magnetic core having a pair of auxiliary openings therethrough, means for applying quantized amounts of magnetomotive force to cause the remanent magnetic state of said core to vary, mutually coupled first and second windings and an output winding wound around a portion of said core and through said auxiliary openings, first and second junction transistors each having three electrodes, one electrode of each being connected in common, a second electrode of each transistor being connected in series with said first and second windings respectively, the remaining electrode of each respective transistor being cross connected to said first and second windings respectively, the frequency of the signal induced in said output winding of the multivibrator being determined by the then remanent magnetic state of said core.

References Cited by the Examiner

UNITED STATES PATENTS

| | | | |
|---|---|---|---|
| 1,227,302 | 5/1917 | Osnos | 323—89 |
| 2,480,265 | 8/1949 | Rubenstein | 324—43 |
| 2,587,481 | 2/1952 | Kaehni et al. | 324—43 |
| 2,591,406 | 4/1952 | Carter et al. | |
| 2,740,086 | 3/1956 | Evans et al. | |
| 2,783,384 | 2/1957 | Bright et al. | |
| 2,802,185 | 8/1957 | Dewitz. | |
| 2,811,639 | 10/1957 | Southeimer. | |
| 2,854,580 | 9/1958 | Uchrin et al. | 331—113 |
| 2,882,403 | 4/1959 | Dewitz | 331—113 |
| 2,905,906 | 9/1959 | Kittl | 331—113 |
| 2,912,653 | 11/1959 | Tillman | 331—113 |
| 2,915,710 | 12/1959 | Schieve et al. | 331—112 |

OTHER REFERENCES

"Commutation and Nondestructive Read-Out of Magnetic Memory Cores in Earth Satellite:" by C. B. House in paper for presentation at AIEE Winter General Meeting N.Y.C., Jan. 21–25, 1957.

Magnetic Core Event Counter for Earth Satellite Memory by Schefer: Paper for presentation at AIEE Winter General Meeting N.Y.C., N.Y. Jan. 21- 25, 1957.

The Transfluxor by Rajchman et al.: in Proc. of the IRE pages 321–332 Mar. 1956.

ROY LAKE, *Primary Examiner.*

HARRY GAUSS, HERMAN K. SAALBACH, GEORGE N. WESTBY, BENNETT G. MILLER, *Examiners.*

UNITED STATES PATENT OFFICE

CERTIFICATE OF CORRECTION

Patent No. 3,221,270 November 30, 1965

Robert M. Tillman et al.

It is hereby certified that error appears in the above numbered patent requiring correction and that the said Letters Patent should read as corrected below.

Column 3, line 26, for "windows" read -- windings --; line 42, for "resistor" read -- transistor --; column 4, line 57, after "trigger" insert -- pulse --; column 5, line 2, for "donations" read -- domains --.

Signed and sealed this 20th day of September 1966.

(SEAL)
Attest:

ERNEST W. SWIDER
Attesting Officer

EDWARD J. BRENNER
Commissioner of Patents